UNITED STATES PATENT OFFICE 2,370,157

RECOVERY AND REUSE OF COPPER SULPHATE FROM WASH LIQUORS

William H. Furness, Haddonfield, N. J., assignor to American Rayon Company, Inc., Riverton, N. J., a corporation of New Jersey No Drawing. Application May 1, 1940,
Serial No. 332,695

9 Claims. (Cl. 18—54)

This invention relates to the recovery and reuse of copper (cupric) sulphate from wash liquors in the manufacture of cellulose products (such as rayon, staple, films and the like) from cuprammonium cellulose solutions.

In one or more stages of the manufacture of these cellulose products, the wash liquor contains recoverable quantities of copper sulphate, as for example in that stage where the filaments, films, or other products are decoppered by being subjected to a dilute sulphuric acid wash. The spent decoppering liquor contains cupric sulphate, sodium sulphate, and usually some free acid.

Where there is sulphuric acid present, sufficient cupric hydroxide or black copper oxide is added to neutralize the free acid. The reaction produces additional cupric sulphate.

Cupric hydroxide $(Cu(OH)_2)$ is now added to the solution in the ratio of at least three mols for each mol of $CuSO_4$. The copper precipitates as a basic copper sulphate which is removed from the solution containing sodium sulphate as by centrifuging, filtering, or settling.

It is, of course, obvious that the quantity of cupric hydroxide which is required to neutralize the excess acid of the wash liquor and the further quantity which is required to precipitate the basic copper sulphate may be added in a single addition. Where black copper oxide is used to neutralize the acid, it is used before the addition of the cupric hydroxide and dissolved with the aid of heat.

To the basic copper sulphate removed from the solution containing sodium sulphate, there is now added ammonia and water, four mols of $NH_3$ being added for each mol of $SO_4$ in the basic copper sulphate. This brings about the formation of copper tetrammonio sulphate $(Cu(NH_3)_4SO_4)$, and regenerates the copper hydroxide which was used in the precipitation of the basic sulphate.

The two reactions on which the complete recovery cycle is based are illustrated by two general equations below in which no exact formula for copper basic sulphate is given, the molar proportion of copper hydroxide being merely indicated by X, where X stands for at least 3 mols.

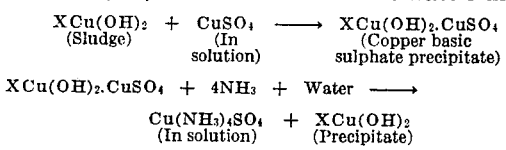

The equations are written in this general manner since the composition of basic copper sulphate is capable of very wide variation according to the conditions used for precipitation including method of mixing, violence and time of agitation, etc. In practice, I have found that 4.3 mols of copper hydroxide will give rapid and complete precipitation of all the copper sulphate but that with prolonged stirring, smaller quantities of copper hydroxide may be used. In general at least 3 mols of $Cu(OH)_2$ per mol $CuSO_4$ will be required, but it is to be understood that I do not wish to limit myself to any specific molar proportion of copper hydroxide. Actually, provided that the amount of copper hydroxide used is sufficient to effect complete precipitation of the copper sulphate, the exact composition of the basic sulphate is not of consequence to my invention, and neither is it of consequence if this basic copper sulphate contains free admixed copper hydroxide since in any event the copper hydroxide used will be recovered and re-used.

The copper tetrammonio sulphate which is formed by the action of ammonia and water on the basic copper sulphate is soluble and is separated from the precipitated copper hydroxide as by centrifuging, settling, or filtering. The copper hydroxide thus obtained, with or without washing, is used to convert more copper sulphate into basic copper sulphate, and the copper tetrammonio sulphate is utilized to prepare spinning solutions ("goo").

In practice, a very small amount of the copper hydroxide dissolves in the copper tetrammonio sulphate solution. This is not of consequence since a copper tetrammonio sulphate solution containing a very small amount of dissolved copper hydroxide may be readily used as such for the preparation of spinning solution and in any event, the solution can be completely converted to a copper tetrammonio sulphate solution by addition of very small amounts of sulphuric acid and ammonia. As regards the small disappearance of copper hydroxide from the recovery cycle, this is very readily compensated for by using slightly more copper hydroxide than is required to neutralize the wash liquors in the pretreatment of these solutions prior to the precipitation of basic copper sulphate as outlined.

Also, the copper hydroxide which is recovered for further use in the preparation of the copper tetrammonio sulphate will, after removal from the solution, contain a certain amount of absorbed copper tetrammonio sulphate solution. It is advantageous to remove this absorbed solution from the recovered copper hydroxide by a water wash prior to its re-use in order that soluble copper compounds will not remain in solution when basic copper sulphate is precipitated. This water wash causes no chemical loss since the dilute tetramine solution so obtained may be used in place of part of the water in the formation of copper tetrammonio sulphate solution in the subsequent cycle.

It will thus be seen that there has been provided a process by virtue of which the copper sulphate and acid in the wash liquor are recovered for re-use in the system, in a very simple and effective manner. Moreover, the operators need not be meticulously careful in treating the copper sulphate solution, so long as an excess of cupric hydroxide is used, inasmuch as both the basic copper sulphate and the cupric hydroxide are insoluble and since moreover the copper hydroxide will be recovered. There will be no copper remaining in solution so long as sufficient cupric hydroxide is used.

The sodium sulphate remaining in solution after the separation of the copper basic sulphate may be recovered in any preferred manner. One method is pointed out in my copending application Serial No. 332,694, filed May 1, 1940.

Similarly the black copper oxide which may be used in neutralizing free acid as above described, is likewise obtained in the process described in said last mentioned application.

The copper tetrammonio sulphate obtained may be utilized, for example, in preparing a cellulosic spinning solution in accordance with application Serial No. 129,820, filed March 9, 1937, now Patent No. 2,225,431, dated December 17, 1940; or in accordance with application Serial No. 305,928, filed November 24, 1939, now Patent No. 2,247,124, dated June 24, 1941.

It is to be observed that the presence of appreciable amounts of ammonium sulphate in the acid wash liquors would interfere with the removal of copper sulphate as basic copper sulphate by the use of cupric hydroxide. If any ammonia is present in salt form in the wash liquors, it may be removed as free ammonia during the precipitation of the copper basic sulphate by heating.

While the present invention is utilized in the system of manufacture and recovery described in my copending application Serial No. 332,694, filed May 1, 1940, it is capable of and useful in independent use and is therefore separately claimed.

What I claim is:

1. In the art of producing cuprammonium rayon, a process of recovering copper values from waste wash liquors containing cupric sulphate, which process includes the steps of adding to the cupric sulphate solution, cupric hydroxide to form an insoluble basic copper sulphate, the cupric hydroxide being added in the ratio of from about 3 to 4.3 mols to each mol of sulphate radical present, of separating the basic copper sulphate, and of adding ammonia and water to the basic copper sulphate to produce insoluble cupric hydroxide and a solution of copper tetrammonio sulphate.

2. In the art of producing cuprammonium rayon, a process of recovering copper values from waste wash liquors containing cupric sulphate, which process includes the steps of adding to the cupric sulphate solution, cupric hydroxide to form an insoluble basic copper sulphate, of separating the basic copper sulphate, of adding ammonia and water to the basic copper sulphate to produce insoluble cupric hydroxide and a solution of copper tetrammonio sulphate, and of re-using the cupric hydroxide so produced to treat more of the waste liquor to form additional basic copper sulphate.

3. In the art of producing cuprammonium rayon, a process of recovering copper values from waste wash liquors containing cupric sulphate, which process includes the steps of adding to the cupric sulphate solution, cupric hydroxide to form a basic copper sulphate, of separating the basic copper sulphate, and of adding ammonia and water to the basic copper sulphate to produce insoluble cupric hydroxide and a solution of copper tetrammonio sulphate, using 4 mols of $NH_3$ for each mol of sulphate radical present.

4. In the art of producing cuprammonium rayon, a process of recovering copper values from waste wash liquors containing cupric sulphate, which process includes the steps of adding to the cupric sulphate solution, cupric hydroxide to form basic copper sulphate, of separating the basic copper sulphate, and of adding ammonia and water to the basic copper sulphate to produce cupric hydroxide and copper tetrammonio sulphate, using 4 mols of $NH_3$ for each mol of sulphate radical present, of utilizing the copper tetrammonio sulphate produced in preparing cuprammonium cellulose spinning solution and of utilizing the cupric hydroxide produced in treating additional waste liquors.

5. In the manufacture of cellulose products from cuprammonium cellulose solutions the process of recovering chemicals from wash liquors containing cupric sulphate and sulphuric acid, which comprises neutralizing the sulphuric acid with a copper compound to form cupric sulphate, converting the cupric sulphate present into basic copper sulphate by addition of cupric hydroxide, separating the basic copper sulphate from the liquid, converting the basic copper sulphate into copper hydroxide and copper tetrammonio sulphate by adding ammonia and water, utilizing the copper tetrammonio sulphate to form cuprammonium cellulose spinning solution and utilizing the cupric hydroxide produced to treat more of the wash liquors.

6. In the art of producing cuprammonium rayon, a process of recovering copper values from waste wash liquors containing cupric sulphate, which process includes the steps of adding to said waste liquors cupric hydroxide in the ratio of from about 3 to 4.3 mols to each mol of sulphate radical present so as to form basic copper sulphate, of separating the basic copper sulphate, and of adding ammonia and water thereto in the proportions of four mols of $NH_3$ for each mol of sulphate radical present so as to produce insoluble cupric hydroxide and a solution of copper tetrammonia sulphate, of utilizing the copper tetrammonia sulphate produced in preparing cuprammonium cellulose solution, and of utilizing the copper hydroxide produced in treating additional waste liquors.

7. In the art of producing cuprammonium rayon from cellulosic solutions of tetrammonia copper sulphate by spinning a thread from such solutions and washing the thread so formed, the process of regenerating and re-using tetrammonia copper sulphate from the spent wash liquors which comprises the steps of: (a) adding to spent wash liquors containing copper sulphate, copper hydroxide recovered from spent liquors containing the same; (b) adding to the basic copper sulphate so produced, ammonia recovered from spent wash liquors containing the same; (c) separating the insoluble copper hydroxide formed in the preceding step from the tetrammonia copper sulphate solution likewise formed; and (d) utilizing the tetrammonium copper sulphate to dissolve additional cellulosic material for spinning more rayon thread.

8. The process of claim 7 in which the copper hydroxide produced in step (c) is returned to the cycle for use in subsequently performing step (a).

9. In the art of producing cuprammonium rayon from cellulosic solutions of tetrammonia copper sulphate by spinning a thread from such solutions and washing the thread so formed, the process of regenerating and re-using tetrammonia copper sulphate from the spent wash liquors which comprises the steps of: (a) adding to spent wash liquors containing sulphuric acid and copper sulphate, black copper oxide, to convert the acid to copper sulphate; (b) adding to the solution resulting after performance of step (a), copper hydroxide recovered from spent wash liquors containing the same; (c) adding to the basic copper sulphate so produced, ammonia recovered from spent wash liquors containing the same; (d) separating the insoluble copper hydroxide formed in the preceding step from the tetrammonia copper sulphate solution likewise formed; and (e) utilizing the tetrammonium copper sulphate to dissolve additional cellulosic material for spinning more rayon thread.

WILLIAM H. FURNESS.